Patented June 13, 1933

1,914,061

UNITED STATES PATENT OFFICE

GEORGE WITTY, OF NEW YORK, N. Y.

BRICK

No Drawing. Application filed March 10, 1932. Serial No. 598,100.

This invention relates to improvements in bricks or other masses of building material formed from a compound and to improvements in the process of manufacturing the same; and the object of my improvements is to produce good bricks at less cost than the ordinary burnt-clay bricks and to utilize at the same time materials which are otherwise practically valueless.

Another object of the invention is the provision of a brick of great strength, light in weight and having insulating and sound-deadening qualities and a low degree of absorption.

A further object of the invention is the provision of a brick which will be free from acids and alkalies which will permit nails to be driven in when set, which will be fire-proof and which may be molded into various shapes for flooring or roofing purposes or for the manufacture of articles.

These bricks are formed of a composition consisting of the following ingredients, combined in about the following proportions stated, viz; granulated slag 40 parts, granulated slate 30 parts, calcium hydroxide 20 parts, calcium sulfate 7 parts, potassium sulfate 2 parts, calcium silicofluoride 1 part. The ingredients are then mixed dry and sufficient water added to form a fluid mass. When all the ingredients are commingled, the mass should be of just such consistency as will permit it to be filled into molds. After being placed in the molds the mixture therein is subjected to heavy pressure and after being thoroughly compressed the masses are removed from the molds and transferred into a steam chamber and dried at a temperature of 200° to 350° F.

The final product will be a brick of grayish color which may be converted into any color desired by adding suitable pigments. Bricks thus made of my compound improve with age and have great crushing strength while being light in weight and low in absorption. Furthermore, these bricks provide a better bond with mortar and when so used or exposed to the weather do not scale, crack or disintegrate under extreme atmospheric changes.

While I have specially referred to the product as bricks, the plastic mass obtained from the mixing process may be employed also for the manufacture of hollow tile and partition blocks.

It is obvious that those skilled in the art may vary the ingredients, as well as the proportions thereof, without departing from the spirit of the invention and therefore, I do not wish to be limited to the above disclosure except as may be required by the claim.

What I claim is:—

A composition for making bricks, consisting of slag, slate, calcium hydroxide, calcium sulfate, potassium sulfate and calcium silicofluoride, in about the proportions stated, substantially as set forth.

In testimony whereof, I affix my signature.

GEORGE WITTY.